Patented June 5, 1934

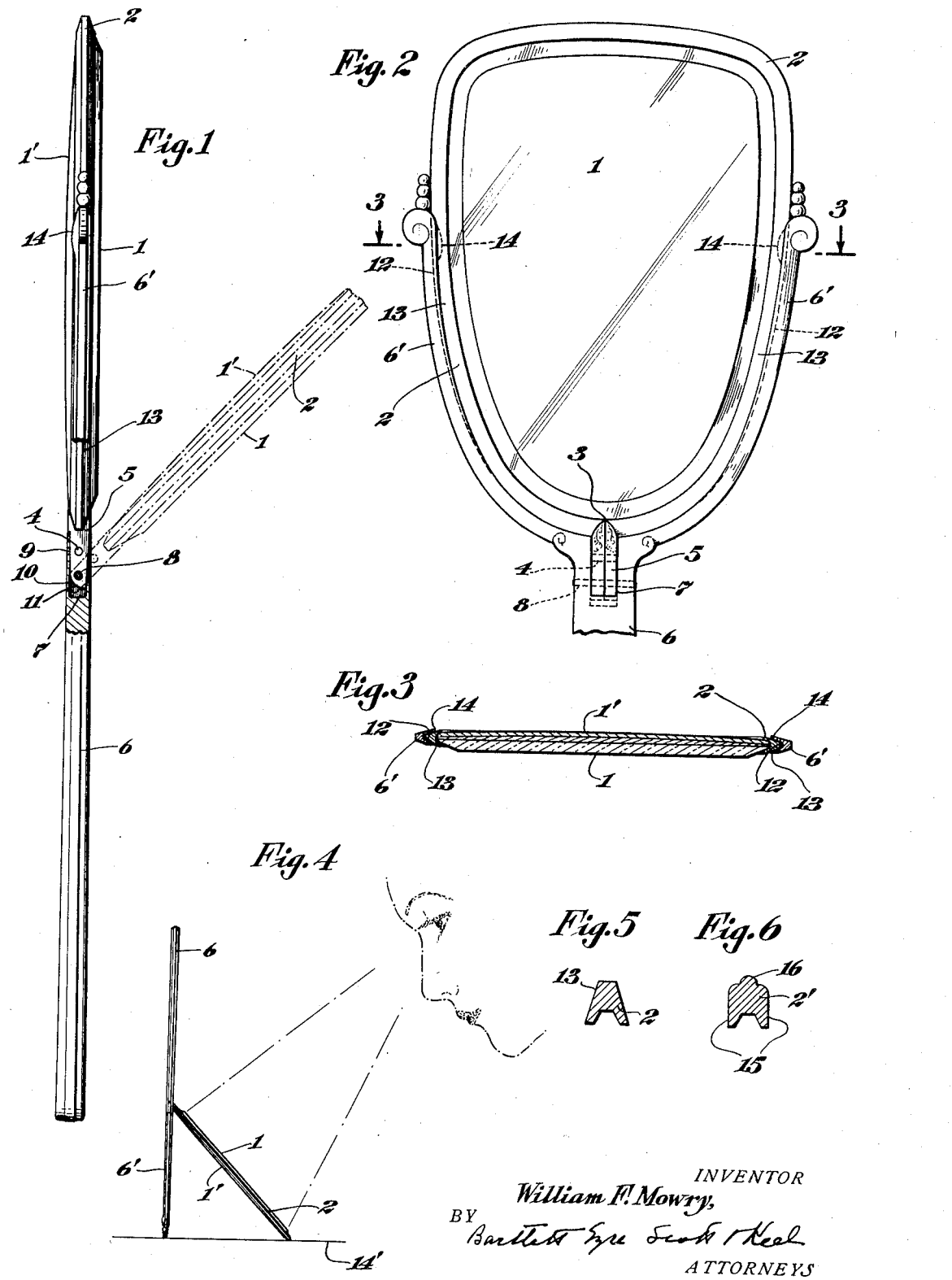

1,961,238

UNITED STATES PATENT OFFICE 1,961,238

MAKE-UP MIRROR

William F. Mowry, Wallingford, Conn., assignor to International Silver Company, Meriden, Conn., a corporation of New Jersey Application June 20, 1933, Serial No. 676,657

14 Claims. (Cl. 45—98)

This invention relates to make-up mirrors.

One object of the invention is a novel construction of mirror which may be used with facility both as a simple hand mirror or as a standing mirror. A further object of the invention is a small mirror comprising a mirror part and a handle part capable of assuming either of two relative positions, one corresponding to the use as a hand mirror and the other as a standing mirror. A further object of the invention is a hand mirror which may be instantly converted to a standing mirror and instantly reconverted back to a hand mirror at the will of the user. A further object of the invention is a mirror structure of this character which presents the mirror at the desired angle for convenient make-up use when used as a standing mirror and which, when used as a hand mirror, forms a convenient easily handled device simulating ordinary hand mirrors. A further object of the invention is a mirror of this character which is characterized by its compactness in structure, notwithstanding the double use, and by its simplicity and ruggedness in construction.

For a better understanding of the above indicated objects of the invention and others which will hereinafter appear, reference may be had to the accompanying drawing wherein—

Fig. 1 is a side view of a mirror embodying the invention;

Fig. 2 is a front view with part of the handle broken away;

Fig. 3 is a sectional view along the line 3—3 of Fig. 2;

Fig. 4 is a view of the mirror in use as a standing mirror; and

Figs. 5 and 6 are sectional views of the frame.

The glass 1 of the mirror and its back 1' are mounted in a frame 2 which is split at the point 3 and fastened securely therearound in any suitable manner, as for example by a pin 4 passing through a pair of rigid frame extensions 5 and making a driven fit in the opening therethrough, or of course a screw making a screw fit may be employed in place of pin 4.

The rigid extensions 5 form a projecting arm for pivotally mounting the frame 2 upon a handle 6. The projecting arm 5 is disposed in a corresponding elongated recess or box 7 formed in the upper end of the handle 6 and the pivotal connection of the frame with the handle is formed by a transverse pin 8 passing through the handle 6, the box 7 and the arm or tongue 5. The box 7 has a back 9 against which the arm rests when the mirror is in the hand mirror position indicated in full lines in Fig. 1. The end of the arm 5 is beveled off at 10 and provided with a toe 11 which forms a stop engaging the back 9 of the box 7 in the standing mirror position indicated in dotted lines in Fig. 1 and in full lines in Fig. 4 and limits the pivotal movement of the handle 6 and the mirror frame 2. The handle 6 is provided with a pair of extensions 6' which are formed and curved to correspond to the smaller width or end of the mirror frame 2 and perform the double function of either retaining the mirror in alinement with the handle or supporting it in the inverted position. These extensions 6' are provided with channels or grooves 12 for the reception of the beveled edge 13 of the frame 2, and for firmly holding the mirror and handle in alinement. These channels are preferably of greatest depth near the ends of the extensions 6' and decrease gradually in depth to the junction of the extensions 6' with the handle 6. These extensions 6' are made spring-like or resilient to yield laterally in the plane of the channels 12 to permit the release of the sides of the mirror frame 2 from the extensions 6' or to permit the snapping of the same into retaining position. The extensions carry lugs or stops 14 on the back side to prevent the mirror frame from being pressed backwards through the extensions 6' and thereby preventing undue strains being placed upon the pivotal mounting if one should attempt to press the same backwards.

Instead of the beveled edge 13 the frame 2 may be provided with any other suitable character or style of edge, as for example that indicated in Fig. 6 wherein the frame 2' is formed with parallel sides 15 and provided with a fashioned edge comprising a head 16 which is gripped by the extensions 6'.

With the mirror in line with extensions 6' and sprung into the channels 6 the whole device forms a rigid hand mirror which the user may use as ordinary hand mirrors may be used. When it is desired to use the mirror as a standing mirror for make-up or any other purpose where, for example, it may be necessary to use both hands for the facial make-up, the mirror frame 2 may be readily sprung from within the channels 12 of the extensions 6' and the whole mirror reversed in position and supported upon a surface indicated at 14', as indicated in Fig. 4 whereupon the user may then proceed to use the mirror as an ordinary standing mirror. The extensions 6' here form feet for supporting the mirror in the desired angular position upon a table or dresser. The limiting angular relation between the frame 2 and the handle 6 is determined by the pivotal mounting and the toe 11, and there is a considerable range of angular adjustment between this limit and the position shown in Fig. 4 where the handle is almost vertical. The mirror can with equal facility be converted back to the ordinary hand mirror by springing the mirror back into the channels 12 of the extensions 6'. The convertible mirror device thus set forth simulates the ordinary hand mirror notwithstanding its convertibility and is characterized by its thinness in depth and simplicity in construction and mounting.

I claim:

1. A make-up mirror comprising a mirror frame, a handle upon which the frame is pivotally mounted, said handle having a pair of spring extensions conforming to the curvature of the frame and having a channel for the reception of the edge thereof, and means for limiting the relative pivotal movement of the frame and the handle when the spring extensions are disengaged from the frame edge, said extensions carrying stops on one side of the channel for preventing movement of the frame in one direction from between the extensions and being adapted to assist in supporting the frame when used as a standing mirror.

2. A two-part make-up mirror unit comprising a mirror having a rigidly mounted supporting member, a handle upon which the mirror is pivotally mounted by means of said supporting member, said handle having a pair of spring extensions adapted to grip the mirror to aline the mirror and the extensions when used as a hand mirror and to assist in supporting the mirror as a standing mirror when the extensions are disengaged from the mirror, and means for limiting the relative pivotal movement of the mirror and handle and preventing their collapse when the extensions are disengaged from the sides of the frame for use as a standing mirror.

3. A make-up mirror comprising a mirror frame, a handle upon which the frame is pivotally mounted, said handle having a pair of spring extensions adapted to grip the frame and to hold the frame in alinement with the handle when the mirror is used as a hand mirror and to assist in supporting the frame when the extensions are disengaged from the mirror frame for use as a standing mirror, and means for limiting the relative pivotal movement of the frame and handle when the extensions are disengaged from the sides of the frame, the frame comprising a projecting member and the means limiting the pivotal movement comprising a toe formed on said member and engaging a part of the handle when the limit of the pivotal movement is reached.

4. In a device of the character set forth in claim 1 wherein the pivotal mounting between the frame and the handle comprises a rectangular elongated recess formed in one side of the handle and the frame carries an extension conforming to the shape of said recess and lying flat against the bottom of said recess when the frame is retained between the handle extensions.

5. In a device of the character set forth in claim 1 wherein the pivotal mounting between the frame and the handle comprises a rectangular elongated recess formed in one side of the handle and the frame carries an extension conforming to the shape of said recess and lying flat against the bottom of said recess when the frame is retained between the handle extensions, and said frame extension is provided with a beveled off end which engages the bottom of said recess when the limit of relative pivoting movement is reached.

6. A make-up mirror comprising a mirror frame, a handle upon which the frame is pivotally mounted, said handle having a pair of extensions adapted to hold the frame and to aline the frame and the extensions when the mirror is used as a hand mirror and to assist in supporting the frame when the extensions are disengaged from the mirror frame for use as a standing mirror, the frame comprising an outer narrow edge and the extensions having a channel for the reception of said narrow edge.

7. A make-up mirror comprising a mirror frame, a handle upon which the frame is pivotally mounted, said handle having a pair of extensions adapted to hold the frame and to aline the frame and the extensions when the mirror is used as a hand mirror and to assist in supporting the frame when the extensions are disengaged from the mirror frame for use as a standing mirror, the frame comprising an outer fashioned edge and an inner groove for the reception of the glass and mirror back and the extensions having a channel for the reception of said fashioned edge.

8. In a two-part make-up mirror, a mirror element comprising a frame and a mirror securely and rigidly mounted therein and a supporting element comprising a handle having a pair of diverging spring extensions adapted to grip the opposite edges of said mirror element, the latter being pivotally fastened to said handle at a point adjacent the divergence of said extensions from said handle, said mirror element being adapted to be sprung into and out of engaging relation with said extensions and said extensions being adapted to form one support with the mirror element forming the other support when the extensions are disengaged from the mirror element for use as a standing mirror.

9. A make-up mirror comprising a mirror element having a narrow outer edge, a handle having a pair of spring extensions with channels adapted to receive said narrow edge, said element being pivotally fastened to said handle at a point adjacent said extensions and adapted to be sprung into and out of said channels, said extensions being adapted to form one support with the mirror element forming the other support when the extensions are disengaged from the mirror element for use as a standing mirror, and one of said extensions carrying a lug or stop on the side adjacent the back of the mirror for preventing backward pivotal movement of the mirror from between the spring extensions.

10. A make-up mirror comprising a mirror having a projecting finger, a handle upon which the mirror is pivotally mounted by means of said finger, said handle having a recess formed at one end and on one side thereof and the finger being disposed in said recess with pivotal means passing through the handle, the recess and said arm, the bottom of the recess formed in the handle forming a limiting stop for the finger for limiting the pivotal movement thereof.

11. A two-part make-up mirror comprising a mirror element, a handle upon which the mirror element is pivotally mounted for angular displacement with respect thereto, said handle and mirror element being relatively fixed except for said angular displacement, and an extension on said handle which in one relative angular position of the parts may be fastened to the mirror element to hold the parts against relative angular movement for use as a hand mirror, said extension being readily releasable from said mirror element to permit angular displacement of the mirror element and the handle for use as a standing mirror.

12. A make-up mirror of the character set forth in claim 11 wherein the extension is a spring resilient member which may be sprung into and out of engaging relation with the edge of the mirror element.

13. A make-up mirror of the character set forth in claim 11 wherein the extension has a stop on one side for preventing pivotal movement of the mirror element past said extension in one direction.

14. A two-part make-up mirror comprising a mirror element having a projecting finger, a handle having a recess in one end in which is reposed said finger, means pivotally fastening said finger to said handle within said recess and confining the relative displacements to pivotal movements, and an extension carried by said handle including means whereby said extension may be releasably fastened to an edge of said mirror element.

WILLIAM F. MOWRY.